March 10, 1970
R. F. POST
3,500,077
METHOD AND APPARATUS FOR ACCELERATING
IONS OUT OF A HOT PLASMA REGION
Filed Dec. 19, 1967
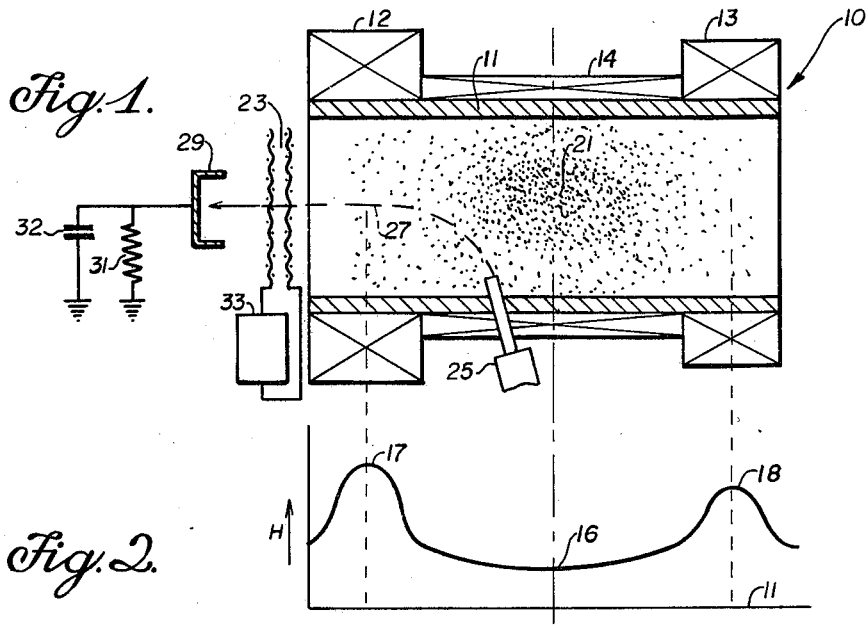
Fig. 1.
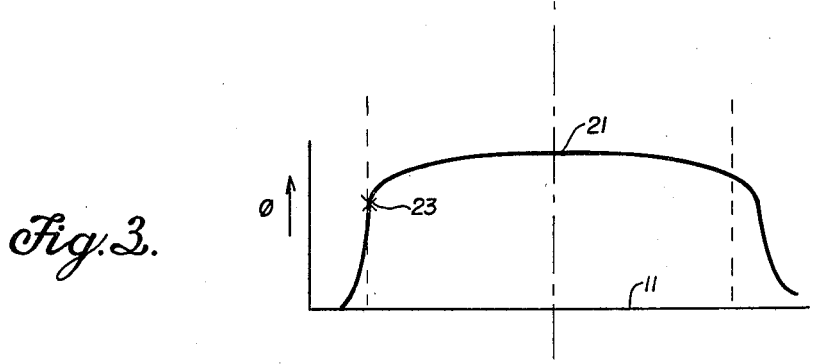
Fig. 2.
Fig. 3.
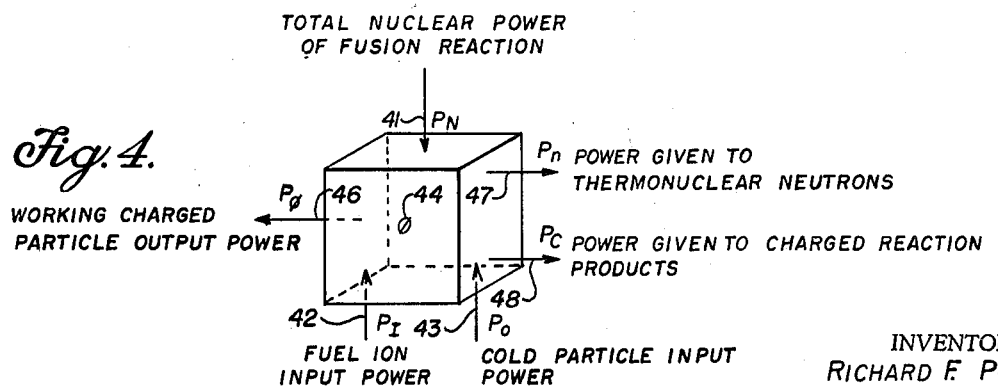
Fig. 4.
INVENTOR.
RICHARD F. POST
BY
ATTORNEY

United States Patent Office 3,500,077
Patented Mar. 10, 1970

3,500,077
METHOD AND APPARATUS FOR ACCELERATING IONS OUT OF A HOT PLASMA REGION
Richard F. Post, Walnut Creek, Calif., assignor to the United States of America as represented by the United States Atomic Energy Commission
Filed Dec. 19, 1967, Ser. No. 691,861
Int. Cl. H02k 45/00
U.S. Cl. 310—11                                                9 Claims

ABSTRACT OF THE DISCLOSURE

Acceleration of ions from a magnetically confined hot plasma by introducing neutral particles through magnetic field regions near the plasma, at energies and along directed beam paths at which the particles are ionized and electrostatically accelerated out of the plasma, whereupon the accelerated ions may be directly converted to an electric current.

BACKGROUND OF THE INVENTION

Field of the invention

The present invention relates generally to high temperature gas technology, and more particularly to methods for producing accelerated charged particles utilizing the magnetic field regions serving to confine a hot plasma, whereupon the accelerated charged particles may be directly converted to an electric current.

Description of the prior art

My prior Patent, No. 3,170,841, entitled "Pyrotron Thermonuclear Reactor and Process," issued Feb. 23, 1965, sets forth methods for producing high temperature gases or plasmas, and for removing energy from a plasma. In general, these techniques and others directed to similar purposes provide a plasma contained within a magnetic field, e.g., by injection of energetic particles and/or manipulation of the magnetic confinement fields. These fields, which may be of the order of 20 to 100 kilogauss, are generated by electrically energized magnet coils. The large reactances of the coils produce undesirable side effects, such as undesirable amounts of ohmic heating in cryogenic magnets. Accordingly, variations of the coil field strengths, required in certain energy recovery procedures provided heretofore, are inefficient as a means for recovering energy from a plasma.

SUMMARY OF THE INVENTION

I have now invented a method for extracting energy from a plasma in the form of charged particles accelerated from the thermonuclear or other high temperature plasma region disposed in a magnetic field confinement zone which does not require dynamic manipulation of the magnetic confinement fields.

Briefly stated, my method for obtaining accelerated charged particles from a magnetically confined plasma involves the injection of neutral particles into a particular region of the magnetic field confining the plasma, where the neutral particles become ionized, but do not become trapped in the main body of the plasma itself. The region of the magnetic field chosen for this purpose is near a magnetic mirror field existing or especially provided for the purpose, across which an electrostatic potential is produced as described hereinafter. After the neutral particles become ionized, the injected particles are accelerated by the electric field produced by the appropriately arranged magnetic mirror portion of the magnetic containment field. Accelerated, positively charged particles are selectively separated from electrons and from lower energy positive particles to be collected exteriorly to produce electrical energy from the thermal energy resident in the plasma. This electrical energy may either be generated as a steady (D.C.) current, or may be made to possess an A.C. component by control of the rate of introduction of the neutral particles.

Accordingly, general objects of the invention are to provide methods and apparatus for producing charged particles accelerated out of a high temperature plasma, and converting these particles to electrical energy in a manner which does not require the manipulation of the confining magnetic field.

BRIEF DESCRIPTION OF THE DRAWING

FIGURE 1 is a sectional schematic view of a magnetic mirror type device for producing and containing high temperature plasmas as adapted for operation in accordance with the present invention;

FIGURE 2 is a plot of the magnetic field intensity along the axis of the device of FIGURE 1;

FIGURE 3 is a plot of the ambipolar potential along the axis of the device of FIGURE 1. The existence of such a potential is inherent to confinement by mirrors, although its distribution may vary with the actual embodiment; and FIGURE 4 is a schematic diagram of power input/output relations for a unit of plasma volume.

DESCRIPTION OF THE PREFERRED EMBODIMENT

For accelerating charged particles from magnetic field regions which confine a hot plasma, certain properties of magnetic mirrors, i.e., gradiently intensified magnetic field regions, are used. A variety of magnetic field configurations having such magnetic mirror field regions are utilized in controlled fusion and similar technologies. Earlier magnetic mirror machines, e.g., Pyrotrons, were characterized by a magnetic field radially symmetric about an axis. In such devices, two or more intensified magnetic field regions, i.e., annular magnetic mirror field regions, are usually located near the ends of an elongated, uniform, axially symmetric, magnetic field region defining a plasma confinement zone. Energetic ions are trapped with electrons between the two mirror regions in the magnetic potential well of said zone, thereby forming a central plasma body in which thermonuclear reactions can occur to release energy, effectively heating the plasma. More recently, multiple magnetic mirrors, as well as other more complex field region devices, have been developed, as described in my prior Patent, No. 3,101,310, dated Aug. 10, 1963, and entitled "Magnetic End Closures for Plasma Confining and Heating Devices." The present invention applies to all of these configurations and others, as well. Therefore, one should be aware that, while my invention is described with particular reference to Pyrotron thermonuclear reactors, it applies to any device confining charged particles by means of gradiently intensified magnetic mirror field regions.

The invention is described specifically with reference to FIGURE 1, wherein for purposes of explanation, there is shown a magnetic mirror thermonuclear reactor device 10, comprised basically of housing 11, encircled at the ends and control regions, respectively, by coils 12, 13 and 14, for producing the necessary magnetic field configuration. The apparatus of FIGURE 1 is enclosed in a vacuum chamber, not shown. The end coils 12 and 13 are intended to carry a higher current density distribution than coil 14, said coils collectively creating a substantially uniform central magnetic field region 16 with gradiently intensified reflector field regions 17 and 18, where field region 17 is at least slightly more intense than region 18.

In summary, intensified magnetic field regions 17 and 18 of a magnetic containment field are called "mirror field regions" or "magnetic mirrors," because ions spiralling around the field lines, called guiding centers, are reflected to reverse their direction of travel at the mirror regions, as disclosed in my aforesaid patent. However, the spiralling ions must possess a sufficient energy component perpendicular to the guiding centers, that is, rotational, as compared to translational, to achieve reflection. If ion energy is principally translational along the field lines, rather than rotational, the ions will pass into "loss cones" where escape from the confinement field can more readily occur.

Having established the appropriate magnetic field, plasma fuel particles, e.g., light element fusionable isotopes and mixtures such as deuterium, tritium, $He^3$, etc., produced by methods well known in the art, are injected into housing 11 from any suitable source, to produce a charged particle plasma or high temperature gas. Once they are heated and attain high kinetic energies, the charged fuel particles are confined in central field region 16. The vast majority of ions attempting to escape from the central region 16 will be reflected by mirror regions 17 and 18 to form a confined plasma body. The plasma contained by a magnetic mirror confinement field will develop a positive ambipolar electric field potential. This plasma electrostatic potential is illustrated in FIGURE 3, wherein the peak potential plane 21 represents the normal maximum positive potential that can be expected in a mirror machine. The Greek letter $\phi$ on the ordinate of FIGURE 3 represents the intensity of the electrostatic ambipolar potential. The abscissa of FIGURE 3 represents the axial position along the apparatus of FIGURE 1.

Initially, in establishing a plasma, electrons escape from the high temperature confinement region at a more rapid rate than do plasma ions, since the relaxation time for Coulomb electron-electron scattering is much less for electrons than for ions of equal energy. Hence, the central plasma body develops a positive space charge, connoting an electrostatic potential generally termed the "ambipolar potential," having a maximum in the dense plasma region, and falling upon approach to the surface of the magnetic containment field. The ambipolar potential which is produced by a difference in diffusion rates of ions and electrons is of such a polarity that, as it builds up, the preferential diffusion rate of the electrons is increasingly opposed, and the diffusion rate of the electrons and ions equalize to establish an equilibrium potential. The ambipolar potential extends from the zone occupied by the plasma to exterior confines of the magnetic mirror fields, i.e., near the open ends of a mirror machine.

Once an ambipolar potential exists, low energy neutral particles are directed into the plasma toward a magnetic mirror region. The neutrals are readily ionized by the interaction of the neutrals with the plasma ions and electrons. Since the addition of too large a number of ions and electrons to the plasma region will reduce the ambipolar potential excessively, the rate at which neutrals are injected must be regulated to a level at which an effective potential remains, while a suitable proportion of ions, to be utilized in producing the electrical current, emerge from the plasma and magnetic containment zone. The resultant stream of particles may be collimated into an ion beam and used directly or applied to an electrical circuit.

Only charged particles which have a sufficiently small rotational energy to permit their penetration through the magnetic mirror may be effectively accelerated out of the plasma region. Hence, injected neutral particles to be extracted as ions are introduced with very low rotational energies. We may define these ions which are principally affected by the electrostatic ambipolar field rather than the magnetic field as "work ions."

For present purposes, the probability that an injected low energy neutral particle, e.g., an atom, will merely ionize must be greater than the probability that it will enter into a charge exchange reaction with hot plasma ions, and much greater than the probability that it will enter into a thermonuclear reaction in the event the injected particle is a thermonuclear fuel. Hence, to insure a large probability for ionization, rather than for other non-electrical energy-producing effects, and to render the escaping ion energy more homogenous, the energy of the injected neutral particle must be kept low, i.e., below 60 kev., compared to the energy of the plasma ions. Once ionization of the neutral particle occurs, the ions produced are accelerated out of the plasma region by the ambipolar electric field of the plasma produced by interaction of the plasma particles and the magnetic field.

To establish a flow of work ions in a selected direction out of the plasma, and at the same time to minimize the accompanying flow of plasma particles, the intensity of magnetic mirror or mirrors on one side of the central confinement region is made to be at least slightly less than others that may be present in the field. If neutral particles are then injected on the side of the confinement chamber nearer the high intensity mirrors, work ions produced therefrom tend to energe selectively from this side of the mirror field. Having low energy, the neutral particles possess the greatest probability for becoming ionized and being accelerated out of the plasma region. Acceleration occurs through the center of the mirror region nearest the point of injection. Since the mirror field nearest the injection point is made higher in intensity than the other mirrors of the containment field, hot ions which escape the plasma region will generally not escape through the mirror where the work ions appear. The higher intensity mirror field is arranged, as disclosed hereinafter, to preferentially discharge work ions from the containment zone. As the work ions travel into the loss cones at a mirror region, they gain energy from the ambipolar electric field. Work ions successfully passing through the magnetic mirrors are directed to strike a collector plate which is maintained at a potential nearly equal to the kinetic energy acquired by the working ions.

The injection of work ions may be time-varied to produce an alternating current at the collector plate if desired. The frequency with which the neutral input is varied yields a corresponding electrical frequency for the work ions. The resulting A.C. current component is then applied to a transformer (not shown) in a power transmission circuit. Injected particles which become ionized and have low kinetic energies are influenced both by magnetic and electric forces, but principally by electric forces arising from the ambipolar potential. For example, D. J. Ben Daniel, writing in the Journal of Nuclear Energy, vol. 3, 1961, pages 235–241, shows the variation in potential between the centerplane and the end regions of a mirror system in his FIGURE 2.

The existence of the ambipolar potential is utilized to determine the position at which the neutral particles are to be injected. Thus, neutral particles would not be injected at the centerplane of a mirror system, since there would be an uncertainty in the direction of travel of the ions produced therefrom, and the injected neutrals would tend to be entrapped in the plasma body.

Data for obtaining values for the ambipolar potential for a given mirror ratio are plotted in FIGURE 1 of the article "Equilibrium Ambipolar Potential in a Mirror Machine," by Richard F. Post, appearing in the Physics of Fluids, July, 1961.

Injection of low energy neutral particles is accomplished by injection means 25 so that the neutral particles become ionized. One such apparatus for injecting neutral particles is described in U.S. Patent 3,152,959, C. C. Damm, dated Oct. 13, 1964, and entitled "Injection Method and Apparatus for Controlled Fusion Devices." The type of neutral particle to be injected is selected for optimum energy extraction from the plasma, with the condition that a favorable cross section for ionization exists when the neutral particles interact with the plasma particles. Cross sections for various plasma reactants and so-called impurity atoms are well known in the art. For example, particles of higher atomic number, capable of multiple charge ionization, would be preferable to particles of lower atomic number, since more kinetic energy could be carried away from the plasma region, per particle, as long as the higher atomic number particles had a favorable ionization cross section compared to the charge exchange cross sections, i.e., plasma capture, of the particle. An example of gases capable of multiple charge ionization at relatively low plasma temperatures are helium and lithium.

These two design features enable work ions (formerly neutral particles) to emerge preferentially through mirror 17, and escaping ordinary plasma ions to emerge preferentially from mirror 18. The high energy plasma ions have mainly rotational energy as noted above, and are reflected in their direction of travel by magnetic mirrors 17 and 18. Should the plasma ions lose some of their rotational energy, they will escape through the mirrors. By making one mirror less intense than the other, a preferential direction for escape of plasma ions is established, e.g., at mirror region 18. The escaping plasma ions will have varying amounts of kinetic energy and their presence among the work ions would not be desirable from the standpoint of electrical efficiency. Hence, the escaping plasma ions are directed out of the chamber 11 through a different magnetic mirror 18 than that used to extract the work ions. Neutral particles forming work ions 27, on the other hand, are injected nearer to the stronger magnetic mirror 17. Preferably, the neutral particles are directed radially inward into central magnetic field regions between said plasma body and mirror field region 18, whereat an ambipolar potential exists and peripheral plasma body particles interact with the neutrals to be ionized to form work ions. The particle injection means 25 imparts a low rotational energy to the injected neutral particles to insure that the neutral particles, after ionization, do not become trapped by the magnetic forces associated with magnetic mirrors 17 and 18. Since the work ions are less subject to magnetic forces, they mainly experience the electric force due to the electrostatic potential near point 23 in FIGURE 3. In other words, the work ions 27 do not exhibit any significant probability of passage through the weaker mirror 18, since they would have to climb over the summit 21 of the electrostatic potential hill.

Once the work ions escape from the confines of the magnetic mirror 17, they are captured by a Faraday cup 29 disposed in the path of escape from mirror 17. However, it is to be noted that any suitable device which utilizes the energy of the escaping ions may be used, e.g., a target or the like. Faraday cup 29 has a diameter suitable for intercepting the emerging ions. As the Faraday cup becomes positively charged, current flows through load 31, developing a bias thereacross which limits the loss of secondary electrons and slows the work ions as they approach the Faraday cup 29. An energy-storing element 32 is preferably, but not necessarily, also connected to the Faraday cup 29. Element 32 then releases the energy into load 31. Electrons escaping from housing 11 through magnetic mirror 17 are deflected from the Faraday cup 29 by magnetic grid 23. Power supply 33 provides the small current required by the magnetic grid 23. Details for a suitable magnetic grid are described in prior Patent No. 2,947,902, entitled "Magnetic Grid," issued Aug. 2, 1960. Any other means which will keep an excessive current of electrons from hitting Faraday cup 29 is suitable. Such a grid has the effect of collimating the ions emerging from the magnetic field region to produce an ion beam. In general, the electrons will not have the high kinetic energy which is characteristic of the ions. Hence the electrons will have a greater tendency to follow the sharply curving magnetic field lines from coils 12, 13 and 14, and thus be deflected from Faraday cup 29. The Faraday cup 29 may be placed a few meters away from magnetic mirror 17 to avoid any appreciable further interaction of magnetic field lines with the emerging ions, and to reduce the local plasma density in the vicinity of the cup.

The following dimensions characterize a typical mirror machine configuration utilizing the method of the present invention:

Length of vacuum chamber 11 _____meters__ 3
Diameter of vacuum chamber 11 _____do____ 2
Maximum magnetic field strength at magnetic mirrors _____kilogauss__ 100
Minimum magnetic field strength at centerplane _____do____ 40
Ratio of field strength of mirror 18 to mirror 17 __ 0.9
Plasma density in plasma region 22__particles/cc__ $10^{14}$
Plasma ion energy _____kev__ 200
Plasma electron energy _____kev__ 20
Maximum work ion energy gained due to ambipolar potential, per unit charge _____kev__ 50
Neutral particles (source, work ions) _____ helium
Neutral particle injection energy _____kev__ 0–10
Percent neutral particles ionized _____percent__ 100
Current produced with 2 grams $H_e$ gas injected per minute _____amperes__ 1600
Electrical energy recovered _____watts__ $1.6 \times 10^8$ The above parameters and the description relating to the figures are only one example of my method applied to the mirror machine shown in the figure. My method can be applied to any magnetic mirror configuration wherein charged particles are confined in any magnetic potential well.

Where a plasma of the type described above exists in a thermonuclear reactor, e.g., of the type described in my prior Patent, No. 3,170,841, supra, the efficiency of the power conversion may be optimized. This is accomplished by adjusting the flux of injected cold neutrals so as to yield the highest value of recovered electrical energy without impairing the equilibrium conditions of the reactor. The optimum balance between neutral input and charged output depends ultimately on the plasma potential, which in turn is related to the temperature of the plasma electrons. FIGURE 4 is an energy input/output diagram for a representative volume of the plasma in a thermonuclear reactor. Arrows 41, 42 and 43 represent power input from three sources: (1) $P_N$—the total nuclear reaction power generated by fusion reactions in the volume; (2) $P_I$—the power imparted to thermonuclear fuel ions; and (3) $P_O$—the negligible power input of cold ions entering the reactor. Arrows 46, 47 and 48 represent power leaving the volume: (1) $P_\phi$—the output power of the injected cold neutrals converted to working ions expressible as the product of an injected neutral current J and the plasma potential $\phi$; (2) $P_n$—that fraction of the total power generation represented by escaping thermonuclear neutrons; and (3) $P_C$—the fraction of the total nuclear power generated that is released as energetic charged reaction products, e.g., He and H nuclei in the reaction:

$$_1D^2 + {_2He^3} \rightarrow {_2He^4} + {_1H^1} + 18.3$$

mev. An approximate expression for the output efficiency is

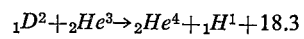
$$\eta = 1 - \frac{I\phi}{P_c}$$

where $\eta$=output efficiency, I=the input current of thermonuclear fuel particles, $\phi$=the plasma potential, and $P_C = P_N - P_n$=the reaction energy released as energetic charged particles (as in FIGURE 4).

Optimization of $\eta$ occurs when $\phi$ (and therefore $T_e$, the temperature of the electrons) is high enough to minimize the cooling effect of the electrons on the reacting fuel ions, yet not so high that $\eta$ falls to the point where uneconomical operation results. The temperature of the plasma electrons is directly proportional to the plasma potential $\phi$, so that controlling $\phi$ will regulate the electron temperature. The plasma potential is readily controllable in the mirror machine reactors in which the present invention may be applied. By regulating the fuel ion injection energy and the flux of injected cold neutrals, the reactor output efficiency as defined above is controlled. Accordingly, the energy retrieval method of the present invention has the advantage that the reactor output can be easily varied to meet predetermined criteria of total output desired, cost per kilowatt, etc.

What is claimed is:

1. A method for producing energetic charged particles, comprising:
   (a) producing and confining a principal plasma body in a charged particle confinement zone established by a magnetic field, including at least a first magnetic mirror field region extending from a boundary of said plasma body to a region outward thereof, said plasma having ions and electrons undergoing ambipolar diffusion outward along said magnetic mirror field region, thereby producing an ambipolar potential along said magnetic mirror field region;
   (b) directing low energy neutral particles into said magnetic mirror region of said magnetic field to be ionized by interaction with said plasma ions and electrons undergoing ambipolar diffusion therein, with said ionized neutral particles being accelerated outwardly along said magnetic mirror field region by said ambipolar potential, to emerge as energetic charged particles accompanied by electrons from said magnetic field; and
   (c) deflecting the electrons away from the energetic charged particles emerging from said magnetic fields to separate the electrons from the energetic charged particles.

2. A method as defined in claim 1, including the step of collecting the ions separated from the electrons emerging from said magnetic field to produce an electric current.

3. A method as defined in claim 1, wherein the energy of said injected neutral particles is within the range 0 to 60 kev.

4. A method as defined in claim 1, wherein electron deflecting grids are disposed in the path of said emerging energetic charged particles and electrons, said grid comprising a current-carrying mesh for deflecting electrons emerging from said magnetic field.

5. Apparatus for producing energetic charged particles, comprising:
   (a) a magnetically permeable housing having coil windings about the length of the housing providing a central region of uniform magnetic field intensity, including coils, with an increased ampere turns distribution at the ends of said housing for providing intensified magnetic mirror field end closures for said central magnetic field within said housing, thereby defining a magnetic mirror containment zone for charged particles;
   (b) means for establishing a high temperature plasma body in said magnetic mirror containment zone, wherein said plasma develops an ambipolar potential localized within said magnetic mirror closure field regions;
   (c) a neutral particle injector positioned to direct neutral particles into peripheral regions of said high temperature plasma in an end magnetic mirror closure field region of said housing, wherein said neutral particles interact with plasma to be ionized and accelerated out of said plasma by said ambipolar potential; and
   (d) means for collecting said charged particles disposed in the path of said charged particles accelerated away from said plasma body in said containment zone.

6. Apparatus as described in claim 5, further defined by a magnetic grid disposed between said plasma body and said charged particle collecting means, said magnetic grid adapted for deflecting electrons away from said collecting means, and to direct charged particles into said collecting means.

7. Apparatus as described in claim 5, further defined in that said neutral particle injector is an injector for injecting neutral particles at a time-varying rate for producing energetic charged particles emerging from said field at a time-varying rate, thereby producing an alternating current component in said charged particles collecting means.

8. Apparatus as described in claim 5, further defined in that one of said coils at the ends of said housing is adapted to produce a substantially higher magnetic field intensity compared to a second of said coils at the ends of said housing, and in that said one coil provides said magnetic mirror field region into which said neutral particles are directed.

9. Apparatus as described in claim 5, wherein said high temperature plasma is a thermonuclear plasma.

References Cited
UNITED STATES PATENTS

| | | | |
|---|---|---|---|
| 3,116,433 | 12/1963 | Moncrieff-Yeates | 313—63 |
| 3,260,869 | 7/1966 | Hall | 176—1 |
| 3,275,867 | 9/1966 | Tsachimoto | 313—63 |
| 3,324,316 | 6/1967 | Cann | 176—1 |
| 3,425,902 | 2/1969 | Consoli et al. | 176—7 |

FOREIGN PATENTS 894,848  4/1962  Great Britain.

REUBEN EPSTEIN, Primary Examiner

U.S. Cl. X.R.

176—3, 7, 9; 313—63, 161; 315—111